June 15, 1943.  R. L. EWALD  2,321,590
FRUIT BOBBING APPARATUS
Filed May 10, 1938  5 Sheets-Sheet 2
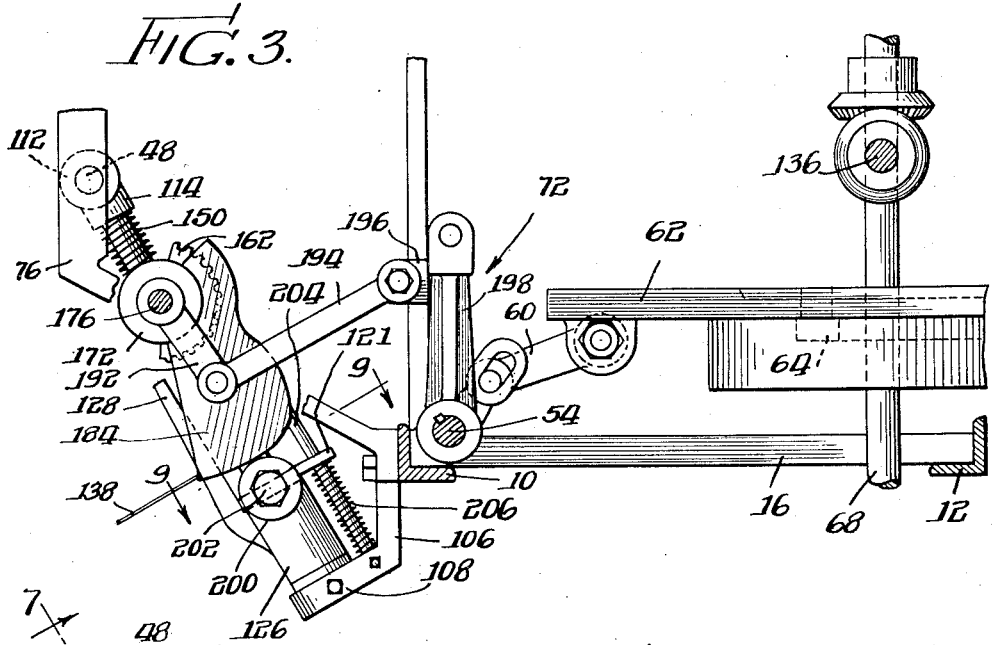
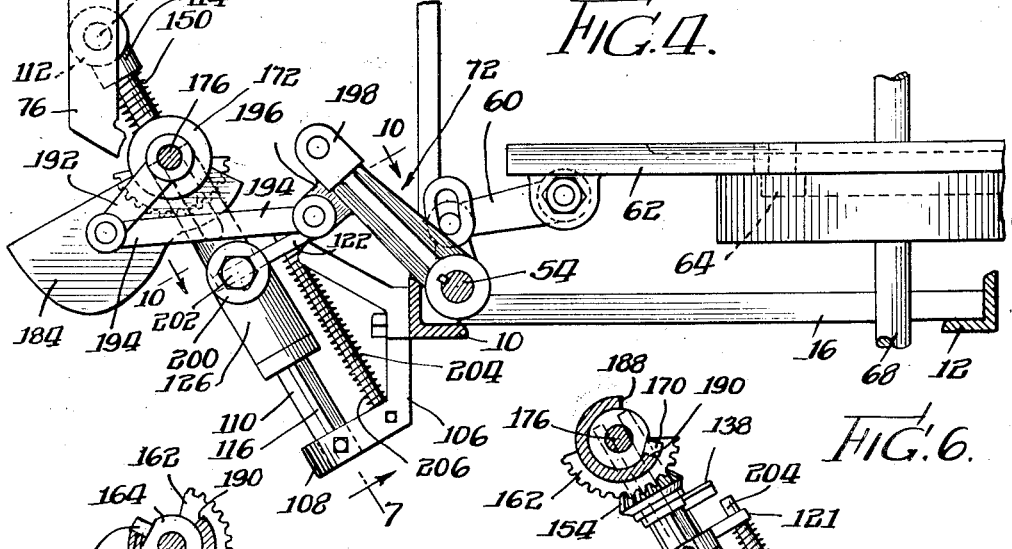
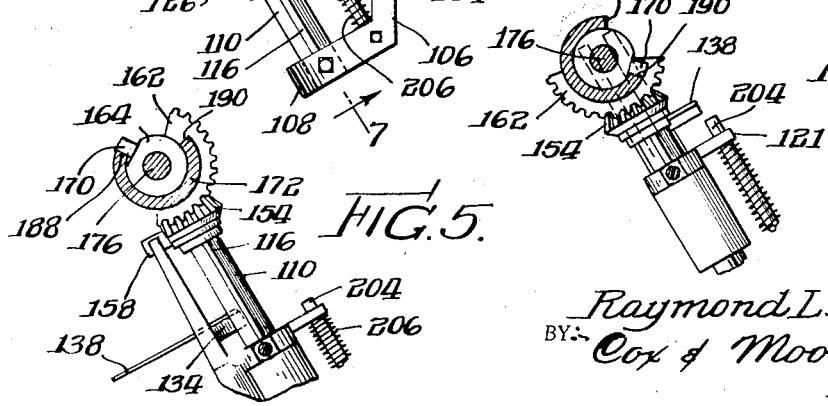
INVENTOR.
Raymond L. Ewald
BY Cox & Moore
ATTORNEYS

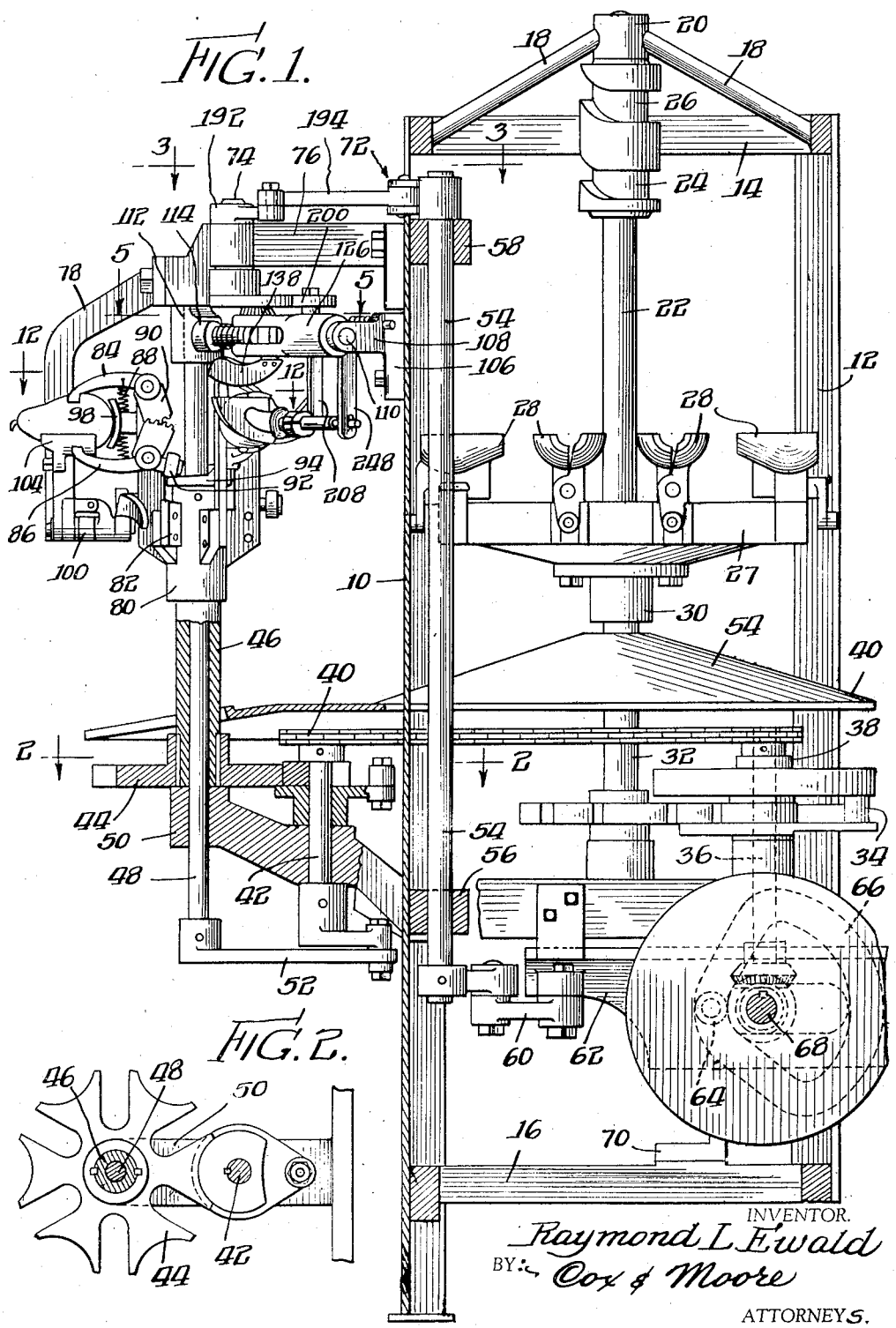

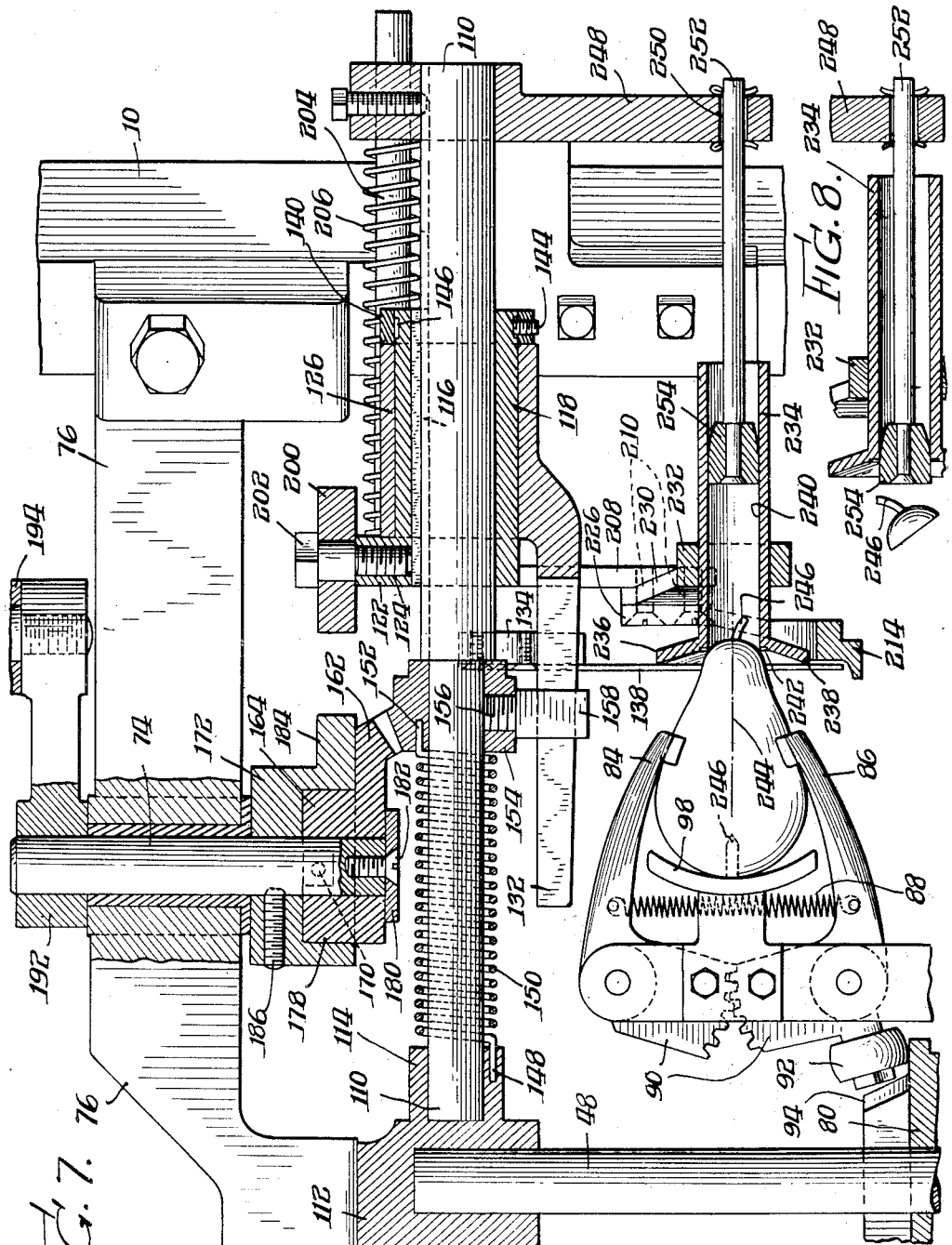

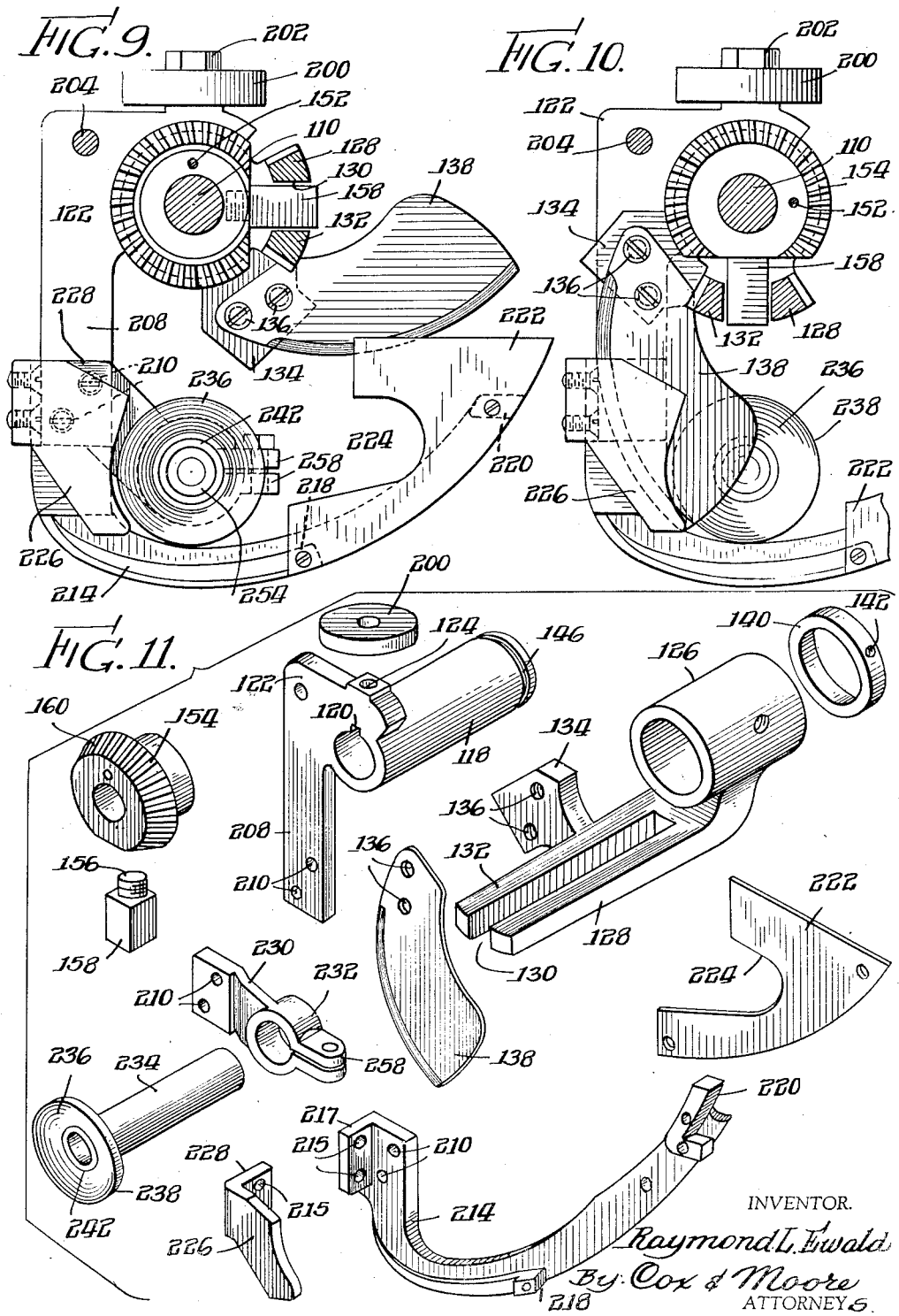

June 15, 1943.  R. L. EWALD  2,321,590
FRUIT BOBBING APPARATUS
Filed May 10, 1938  5 Sheets-Sheet 5
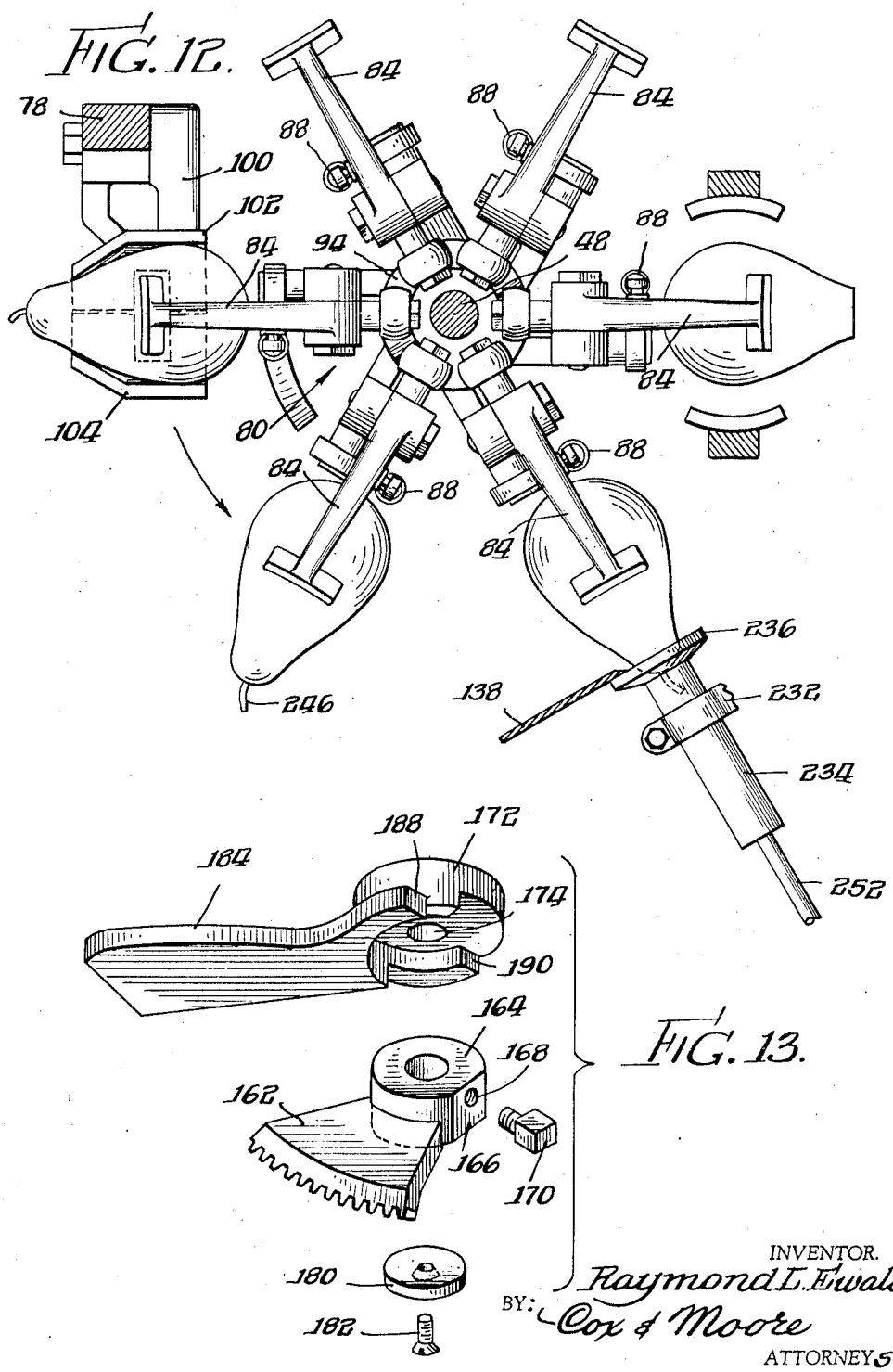

Patented June 15, 1943

2,321,590

UNITED STATES PATENT OFFICE 2,321,590

FRUIT BOBBING APPARATUS

Raymond L. Ewald, Olympia, Wash., assignor to Special Equipment Company, Portland, Oreg., a corporation of Oregon Application May 10, 1938, Serial No. 207,039

27 Claims. (Cl. 146—81)

The present invention relates to bobbing mechanism for bobbing or cutting the stems from pears and other appropriate fruit or vegetables.

Among the objects of the present invention are to provide a bobbing mechanism adapted to form a clean bobbing cut across the stem axis of the fruit and in a most expeditious manner whereby to permit the cooperation of the bobbing mechanism with a high speed, completely automatic machine, for mechanically processing fruit; to provide an improved type of bobbing mechanism including an automatically operated auxiliary fruit holding mechanism for firmly holding the flesh of the neck of the fruit in spaced relation from the base of the stem of the pear, leaving the pear stem projecting freely beyond the holding mechanism so that the stem will not be folded or pressed back into the flesh during the bobbing action and thereby impairing the cut; to provide an improved type of bobbing mechanism including an automatically actuated gauge for automatically gauging the distance of the cut from the base of the stem of the pear; to provide a bobbing mechanism wherein a gauge and fruit holding member are combined whereby to function not only as a gauge for gauging the distance of the bobbed cut from the base of the stem of the pear but also firmly, and preferably resiliently, to hold the flesh of the neck of the pear adjacent the bobbing cut to be made; to provide an improved construction of mechanism wherein the gauging and/or fruit holding member as above described will be positioned together with the shiftable bobbing member in a direction parallel to the stem axis of the pear to be bobbed and wherein the bobbing mechanism thus adjustably positioned by the gauging mechanism is adapted transversely and quickly to move across the stem axis of the pear to effect a bobbing cut; to provide an improved type of shiftable engaging mechanism adapted to be automatically shifted parallel to the stem axis of the pear and to carry bodily therewith the bobbing mechanism whereby the latter is adjustably positioned relative to the stem end of the fruit and including mechanism for imparting a bobbing action to the bobbing mechanism transversely to the line of its positioning movement whereby not only a clean bobbing cut is made but whereby adjustably predetermined portions of the stem and flesh of the neck may be bobbed from the fruit; to provide an improved type of ejecting mechanism cooperating with the fruit gauging member and/or fruit supporting member and bobbing mechanism for ejecting the bobbed portion of the pear; to provide an improved type of adjustment for the gauge member and/or the fruit holding member relative to the neck of the pear and relative to the path of movement of the bobbing mechanism; to provide an improved type of fruit holding means for firmly, yet resiliently, holding the flesh of the neck portion of the pear, in combination with resilient means for holding the butt end of the pear and for holding the middle portion of the pear during the bobbing operation; to provide an improved type of means for guarding the hand of the operator from injury by the bobbing mechanism either during the stationary movement of the bobbing knife or during its bobbing swing or during the movement of the turret for positioning the pear relative to the bobbing mechanism.

While the present invention is disclosed in combination with a completely automatic type of pear processing machine and specifically in combination and adaptation with a type of machine disclosed and claimed in certain pending applications filed by Mark Ewald, it is to be understood that the invention of the present invention is capable with certain adaptations to other types of machines.

The present invention, in certain of its details of construction, is likewise an improvement over the construction shown in the pending application of Mark Ewald, Serial No. 621,857, filed July 11, 1932, which became Patent No. 2,161,806 on June 13, 1939, and therefore, insofar as certain features in common with said prior application are shown herein, no claim is made to the details of said features, unless in cooperation and combination with the improved features of construction disclosed and claimed herein.

Referring now to the drawings in detail—

Fig. 1 illustrates a side view partly in section of one form of machine to which the improved bobbing mechanism is applied;

Fig. 2 is a plan view of the Geneva movement on line 2—2 of Fig. 1;

Figs. 3 and 4 are plan sections taken on line 3—3 of Fig. 1 in different positions;

Figs. 5 and 6 are different views of plan sections taken on line 5—5 of Fig. 1;

Fig. 7 is a view taken on line 7—7 of Fig. 4;

Fig. 8 is a detail view of another position of the ejector;

Fig. 9 is a section taken on line 9—9 of Fig. 3;

Fig. 10 is a view taken on line 10—10 of Fig. 4;

Fig. 11 is a composite view of the bobber assembly;

Fig. 12 is a plan section taken on line 12—12 of Fig. 1; and

Fig. 13 is a perspective view of the operating cam for actuating the bobber slide and of the segment gear for turning the bobbing knife.

The present bobbing mechanism for pears is illustrated and described preferably in connection with an automatic machine for processing pears, of the type shown in certain pending applications filed by Mark Ewald. Figure 1 shows a side view of one type of such machine. It is to be understood, however, that the mechanism herein illustrated and claimed, in its broader aspects, is capable of adaptation to other types of machines.

Referring to the apparatus shown in Figure 1, it comprises in general an upright frame consisting of four upright posts 10, 12, only the front two of which are shown, and suitable cross frame members 14 and 16, forming supports for a part of the operating mechanism. The top of the corner posts 10 and 12 are longitudinally united by means of a spider or frame 18 which includes a central hub 20 forming a bearing for a central shaft 22 carrying cams 24 and 26 for operating certain mechanism not specifically illustrated and described.

In general the frame members 10, 12 and cross members support and intermittently rotated turret 27 carrying a plurality of fruit holders 28, the construction of which are disclosed and claimed in certain pending Ewald applications. This turret 27 is mounted on a hub 30, which hub in turn is rotated by a shaft 32 intermittently driven by a Geneva movement 34 through the operation of a prime mover, not shown, fixed on the machine. A shaft 36 passes upwardly through a sleeve 38 of the Geneva movement 34 to drive a sprocket and chain mechanism 40, the other end of which drives a shaft 42, which in turn synchronously drives a second Geneva movement 44 for intermittently turning a sleeve 46. A shaft 48 passes upwardly through the sleeve 46. The sleeve and shaft are carried by a support 50 laterally extending from the main upright frame 10, 12. Shaft 48 is oscillatably driven from shaft 42 by means of the crank mechanism 52. A suitable shield 54 overlies the sprocket gearing 40 and the two Genevas 34 and 44 to prevent injury by means of fruit juices, peelings and the like. An elongated vertically extending shaft 54 is mounted in bearings 56 and 58 carried by the main frame members of the machine. The bottom of this elongated shaft is suitably actuated by crank mechanism 60, in turn actuated by a horizontally moving slide 62 having a roller 64 actuated by a cam slot 66 fixed to a power driven shaft 68 carried by suitable supports 70 from the frame members 10, 12 and 16. The upper portion of the shaft 54 carries a crank mechanism 72 for actuating a shaft 74 mounted on a bracket 76 laterally extending from the upper portion of the corner frame posts. The outer end of the bracket 76 in turn forms a support for a depending bracket 78 which extends outwardly and downwardly to a turret 80 mounted on the upper end of the hereinbefore mentioned sleeve 46. This turret 80 carries a plurality of radially disposed relatively shiftable fruit clamping fingers 84 and 86 normally pulled together by means of a spring 88 and shifted to outer position by means of two sectors 90 which intermesh.

One of these sectors carries a roller 92 adapted to cooperate with a cam 94 fixed to shaft 48, which latter shaft passes upwardly within the sleeve 46 and which shaft is oscillated by the crank mechanism 52. This cam 94 has diametrically high and low portions for actuating the rollers 92 either to positively shift the fruit clamping fingers 84 and 86 to outward fruit releasing position or to permit the springs 88 resiliently to pull the fingers in equal and opposite directions toward each other to grasp a fruit.

Cooperating with each pair of these fingers 84 and 86 and mounted upon the same bracket 82 is a laterally extending arm carrying a concave stop or abutment 98 which is adapted to position the butt or calyx end of a pear in a predetermined position. Preferably, this abutment member has a centrally disposed spike or pin for piercing the calyx of the pear to hold it firmly in desired position with the stem axis of the pear horizontally and extending radially of the feed turret 80.

Cooperating with each pair of feed fingers is an auxiliary fruit positioning means comprising a stationary holder and a movable holder. The depending bracket 78 at its bottommost portion is provided with an outstanding arm 100 rigidly supporting a half-section of a fruit cup 102 and laterally mounted on a swingable support is a cooperative half-section of a fruit cup 104 which, when actuated in timed relation with the movement of the clamping members 84 and 86 is adapted to shift downwardly to an out-of-the-way position to permit the feed turret with the jaws 84 and 86 closed upon a pear laterally to shift the pear in a horizontal plane and in a counter-clockwise direction away from the auxiliary fruit holders 102 and 104 to carry the whole fruit to a bobbing station at which the mechanism of the present invention comes into play.

The bobbing mechanism of the present invention is particularly adaptable and cooperable with means for holding a pear with its stem axis firmly held and with its stem end freely projecting outwardly from the pear holding means. In general, the bobbing mechanism of the present invention is particularly adaptable with fruit holding means which firmly holds a pear with its stem axis extending horizontally and also radially from the feed-in turret and particularly where the feed-in turret is adapted to move intermittently, bringing the pear so held to a stop at the bobbing station where the bobbing action is carried out. The feed mechanism is constructed and arranged to cooperate with the bobbing mechanism whereby successively to bob a sequence of pears of variant shapes and sizes. The bobbing mechanism of the present invention is designed to effect a clean bobbing cut exactly transversely of the stem axis of the pear and in a very quick manner whereby to assist in providing a high speed machine for increased processed fruit production.

The details of construction of the fruit holding means disclosed above are set forth and claimed in an application filed by me entitled Fruit feeding apparatus, Serial No. 207,033, filed May 10, 1938, and except insofar as the feeding mechanism combines with and cooperates with the bobbing mechanism, no claims are made herein to the feeding mechanism per se.

The bobbing mechanism

Extending outwardly from the upright frame member 10 is a bracket 106. This bracket is provided with an angularly extending portion 108 which is apertured to provide a bearing for a shaft 110. Fixedly secured to the laterally extending supports 76 is a depending bracket 112 which has an outwardly extending sleeve 114. The shaft 110 is thus supported in the sleeve 114 and in the aperture of the bracket arm 108.

On the upper side of this rod 110 is a spline 116 (see Fig. 4) which extends from within the wall of the aperture in the arm 108 toward the support of the rod 110 within the sleeve 114. Longitudinal movement of this rod 110 is prevented by a set screw passing through the arm 108 into rod 110. Reciprocably disposed upon the rod 110 is a sleeve 118 having a groove 120 therein for receiving the spline 116, the latter preventing the sleeve from rotating about the rod. At the left end of this sleeve 118 is an integral upstanding flange 122 provided at its top surface with an aperture 124.

Rotatably mounted up the sleeve 118 is a second sleeve 126 having laterally extending therefrom a bifurcated member 128, there being a slot 130 between the divided parts of this bifurcation 128. Upon one of the bifurcations 132 of this member 128 is a laterally extending bracket 134 to which is detachably and rigidly fixed as at 136 a bobbing knife or blade 138. A collar 140 carrying a set screw aperture 142 is adapted to surround the extreme right portion of the sleeve 118 and a set screw 144 is adapted to enter a groove 146 in the extreme right end of this sleeve 118, whereupon the sleeve 126 is confined upon the sleeve 118 in a detachable manner, the same being confined between the upstanding lug or abutment 122 at the left, and the collar 140 at the right.

Fixed to the socket 114 which supports the left hand end of the shaft or rod 110 is the end 148 of a coil spring 150 which coilingly surrounds the left hand end of the shaft 110. The right hand end 152 of this spring is attached to a toothed member 154 rotatable on rod 110. A portion of the periphery of this toothed element 154 is cut away to provide a flat portion which is suitably drilled and threaded to receive the threaded end 156 of a squared lug or actuator 158. Meshing with the teeth 160 of this element 154 is a segment gear 162 having an enlarged hub 164. One side 166 of this hub is cut away to provide a flat portion having a threaded aperture to receive the threaded shank of a lug 170. The segment gear cooperates with a cam, in perspective thereabove in Fig. 13. This cam is provided with a central hub or collar 172, apertured as at 174 to fit about the shaft 74. The hub 164 of the segment gear interfits with a face of this cam, being countersunk therein as shown at 176 in Fig. 7. Both the cam and the segment gear are held in nested position on the shaft 74 by an end washer 180 and a screw 182. Cam 184 integrally on the collar 172 is held rigid with the shaft by a set screw 186. Segment gear 162 is rotatable relatively to shaft 74.

The underside of the cam 172 is provided with suitable spaced stop faces 188 and 190 adapted to actuate or turn the lug 170 of the segment gear. The upper end of shaft 74 is oscillated by a crank 192 in turn connected with a lever 194 which in turn is pivoted to a short arm 196 on the outer end of a long lever 198 rigidly mounted on the upper end of shaft 54. As hereinbefore pointed out, the bottom end of this shaft 54 is driven by the linkage 60 of the horizontally reciprocating cross slide 62. A roller 200 suitably mounted upon a pin 202 threaded into the aperture 124 of the lug 122 is adapted to cooperate with the cam 184.

As shown in Figs. 9 and 11, the upper portion of the upstanding flange 122, which is integral with the sleeve 118, is provided with an aperture adapted to receive a rod 204. The other end of this rod is rigidly held in the bracket or support 108. A coil spring 206 is confined between the upstanding flange 122 and the bracket 108 whereby normally to urge the inner sleeve 118 away from the bracket 108 along the spline 116 to fruit gauging and fruit holding position as hereinafter explained.

This upstanding flange 122 is provided with a preferably integral downwardly extending arm or bracket 208 apertured as at 210 to receive a knife guard 214. As shown, this knife guard 214 has a curvature conforming to the curvature of the bobbing blade 138 when the latter is in its extreme bobbing position, as shown in Fig. 10. And this knife guard with its curvature is arranged to overlie or be in front of the path of movement of the bobbing blade 138 whereby to protect the hands of the operator. The outer end of the knife guard is provided with bosses 218 and 220 whereby the knife plate 222 is attached to the outer end for the purpose of still further protecting the hand of the operator in the movement of the bobbing blade. This knife plate is cut away as at 224 to permit the free lateral movement of the pear when carried by the fruit holding means of the turret whereby the pear can move into bobbing position with respect to the knife guard. An additional knife guard 226 having an attaching lug 228 is attached by screws 215 to the angularly disposed end face 217 of the knife guard 214 so as to prevent inadvertent cutting of the operator by any possible projection of the edge portion of the knife beyond the main knife guard 214 at the side thereof.

Likewise fastened at 210 to the depending bracket 208 of the inner sleeve 118 is an adjustment bracket 232 in the form of a sleeve or bearing. This sleeve carries a fruit holding and fruit gauging mechanism. This mechanism comprises preferably an elongated sleeve 234 rigidly mounted in the sleeve 232. The outer portion of long sleeve 234 is provided with a substantially conical outwardly flaring hollow flange 236, the outer peripheral edge 238 of which is preferably formed at a sharp angle. In addition, the inner periphery of this hollow at its junction with the inner wall 240 of the elongated hollow sleeve 234 is slightly countersunk as at 242 to form a circular fruit holding member and gauge adapted, when the pear is properly positioned, circularly to engage the neck of the pear at a distance spaced from the stem of the pear. This is shown clearly in Fig. 7. It is to be noted that the stem of the pear projects freely through and into the hollow of the sleeve 234 so as to prevent the stem being pushed back or pressed into the flesh of the neck of the pear during the bobbing operation. Experience has shown that this tends to impair the bobbing operation as it disturbs the fine adjustment of the gauging operation and also because these stems are relatively tough and difficult to cut and cause the bobbing knife to make imperfect cuts.

By reference to Fig. 7 it will be noted that when the elongated sleeve 234 is in position, the pear is firmly held at a plurality of points with its stem axis 244 registering with the central axis of the elongated sleeve 234. In this position the pear will be held with its butt centered with respect to the concave pear stop 98 and with the calyx piercing pin 246 piercing or imbedded into the calyx of the pear and with the upper and lower fruit grasping or clamping members 84 and 86 resiliently holding the body of the pear from above and below and with the flesh of the neck of the pear resiliently and firmly held in and by a circular holding member 242 at a circular zone surrounding the stem 246 of the pear. In this position, the bobbing cut is made preferably at a right angle to the axis 244 of the pear by means of the bobbing cutter 138.

Inasmuch as the bracket 232 is rigidly fastened at 210 to the reciprocable inner sleeve 118, the combined fruit holder and gauge member 234 is correspondingly reciprocated toward and from the neck to the pear. In other words, the spring 206 is adapted resiliently to urge the inner sleeve 118 carrying the gauge and pear holder 234 to the left into holding and gauging position.

Means is provided in cooperation with the elongated sleeve 234 for ejecting any bobbed stems from the bobbing mechanism. To this end, a stationary bracket 248 on the arm 168 is provided with an aperture 250 to rigidly mount an ejector stem 252. The stem carries on its inner end an ejector head 254 of shape and size to fit the inner wall 240 of the elongated sleeve 234. Upon reciprocation of the elongated sleeve 234 relative to the stationary ejector 254, any bobbed stem of a fruit which tends to remain within the sleeve 234 is ejected therefrom. As shown clearly in Fig. 8, the ejector 254 preferably moves relative to the sleeve 234 to a position to carry the front portion of the ejector beyond the front portion or conical face of the collar 236. The bracket 239 is provided with any type of means whereby an adjustment is provided for the bearing 232 relatively to the elongated sleeve 234. This means is preferably in the form of spaced lugs 258 adapted to receive an adjusting screw for adjusting the position of the elongated sleeve 234 relative to the bracket bearing 232 whereby to change the holding and gauging position of the holding and gauging member 236, relative to the neck of the pear.

In the operation of the bobbing device, when the turret carrying the fruit holding means with the pear in position as shown in Fig. 7 arrives at the bobbing station, the turret will be brought to a standstill with the stem axis of the pear in register with the central axis of the elongated sleeve 234. In this position and synchronized in operation therewith, the shaft 74 is actuated whereby to turn the cam 184 in a clockwise manner whereby the spring 206 resiliently urges the inner sleeve 118 to the left as viewed in Fig. 7 and also the sleeve 126 carried thereby to the left as similarly viewed, by which movement the bracket member 232 similarly positions the elongated tubular sleeve 234 to the left to bring the gauge portion 242 to a circular contact with the neck of the pear as in the manner shown in Fig. 7, whereby resiliently to assist in supporting and holding the outermost portion of the neck of the pear directly at the base of the stem. Up to this point, the cutting blade 138, specifically the bobbing knife, has been held in upper position, as shown in Fig. 9, by means of the torsional spring 150 acting upon the toothed member 154. No movement of this member 154 up to this point has taken place due to the fact that the actuating lug 170 has remained out of contact with the side walls 188 and 190 of the slot in the underface of the hub 172 of the cam 184. Upon continued movement of the shaft 74 in the same direction, the lost motion of this slot is taken up and the side wall 188 then contacts the lug 170, whereby thereafter to actuate the geared sector 162 and whereby correspondingly to turn the toothed member 154 upon and relative to the shaft or rod 110. Turning of this member 154 through its integral lug 158 as shown in Fig. 7, riding in the bifurcation 130 of the outer sleeve 126, likewise shifts this outer sleeve whereby to swing the bobbing knife 138 to the position shown in Fig. 7 and against the torsion of the spring 150. In this manner, a bobbing cut will be made at right angles to the stem axis 244 of the pear whereby a clean cut or bob of the pear will be made in a very quick manner.

Upon reverse oscillation of the shaft 74, the lug or stop face 188 of the positively driven hub member 172 of the cam will be withdrawn from the lug 170 whereby the torsional spring 150 surrounding rod 110 will shift the bobbing blade back to upper or withdrawn position as shown in Fig. 9. At this time, the combined gauge and pear neck supporting member 236 has not yet moved away from contact with the pear, which means that the knife mechanism carried by this assembly, has not been withdrawn from the pear in a direction parallel to the stem axis of the pear, but in a direction parallel to the plane of the cut whereby any tendency of the sticky surface to adhere to the knife is eliminated. It would be otherwise if the knife were withdrawn from the cut face of the pear in the direction of the stem axis of the pear. However, since the knife has been withdrawn to its upper position as shown in Fig. 9, during this rotation movement of the hub member 172 to permit withdrawal of the shoulder 188 from the actuating lug 170, the roller 200 has been moving along a substantially concentric portion of the cam 184, whereby the gauge and pear holding assembly is not moved to the right. However, as the cam continues to revolve, the roller will contact a high point which will immediately force the roller and the sleeve assembly on which the roller is mounted to the right against the tension of the spring 206. This will cause the withdrawal of the combined gauge and holding member 236 and the bifurcated outer sleeve 126 and the bobbing knife 138 carried thereby.

It will be noted that due to the bifurcation 130, the actuating lug 158 on the toothed member 154 is enabled to actuate the knife 138 about the central axis of the rod 110 while at the same time permitting the knife assembly to move longitudinally of the axis of the rod 110. Upon the withdrawal movement of the elongated sleeve 234 to the right as above set forth, the stationary ejector 254 will be relatively moved to the front of the conical washer 236 whereby to eject the bobbed pear as shown in Fig. 8.

Upon a completion of this cycle, the turret is again intermittently moved to bring a fresh pear to the bobbing station and transport the bobbed pear to the next succeeding processing station of the automatic machine.

Having thus described my invention, what I claim as new and desire to secure by Letters Patent of the United States is:

1. In a bobbing device for pears, the combination of means for holding the pear with its neck end extending in a predetermined direction, a tubular member, means for relatively shifting the pear and the tubular member to a position to cause the tubular member circularly to contact the neck of the pear adjacent the base of the stem, the free end of the stem projecting into the hollow of the tubular member, means for bobbing the neck of the pear while thus held, and stem ejecting means shiftable relatively to and within said tubular member after the bobbing operation to eject the bobbed stem from the tubular member.

2. In a device for bobbing pears, the combination of means for holding the pear with its stem end projecting in a predetermined direction, a tubular member, means for shifting the tubular member axially of the stem of the pear into contact with the neck of the pear with the stem projecting through the bore of the tubular member, said tubular member having a substantially outwardly conically extending skirt, the outer rim of the skirt extending forwardly of the forward end of the tubular member, and bobbing means adapted to pass transversely of the stem axis of the pear and adjacent the conically extending skirt.

3. In a device for bobbing pears, the combination of means for holding the pear with its stem end projecting in a predetermined direction, a tubular member, means for shifting the tubular member axially of the stem of the pear into contact with the neck of the pear with the stem projecting through the bore of the tubular member, said tubular member having a substantially outwardly conically extending skirt, the outer rim of the skirt extending forwardly of the forward end of the tubular member, bobbing means adapted to pass transversely of the stem axis of the pear and adjacent the conically extending skirt, and a plunger operable in said tubular member and relatively thereto for ejecting the bobbed stem from the bore of the tubular member.

4. In a pear bobbing device, the combination of means for holding the pear with its stem axis in a predetermined direction, a shiftable carriage adapted to shift in a direction axially of the stem of the pear while so held, a tubular member mounted on said carriage, spring means for shifting the tubular member outwardly to cause said member circularly to engage the neck of the pear adjacent but removed from the stem of the pear, the stem of the pear projecting through said tubular member, bobbing means mounted on said carriage for movement with said tubular member, and power actuated means for actuating the bobbing means across the stem axis of the pear to bob the same and thereafter to shift the tubular member and said bobbing means away from the pear.

5. In a pear bobbing device, the combination of means for holding the pear with its stem axis in a predetermined direction, a shiftable carriage adapted to shift in a direction axially of the stem of the pear while so held, a tubular member mounted on said carriage, spring means for shifting the tubular member outwardly to cause said member circularly to engage the neck of the pear adjacent but removed from the stem of the pear, the stem of the pear projecting through said tubular member, bobbing means mounted on said carriage for movement with said tubular member, power actuated means for actuating the bobbing means across the stem axis of the pear to bob the same and thereafter to shift the tubular member and said bobbing means away from the pear, and a stationary plunger adapted to fit in the bore of the tubular member and adapted upon movement of the tubular member away from the pear to eject the bobbed stem from the bore of the tubular member.

6. In a pear bobbing device, the combination of a support, means mounted thereon for holding the pear with the stem axis extending in a predetermined direction, a carriage movable parallel with the stem axis of the pear, said carriage terminating in a circular bearing the center of which rests parallel with the stem axis of the pear while held in said holding means, a tubular member mounted in said bearing, means for adjusting said tubular member relative to said bearing in a direction longitudinally of the axis of the tubular member, said tubular member having a portion when said tubular member is projected toward said pear circularly to engage the neck of the pear adjacent the base of the stem, leaving the stem of the pear projecting into the hollow of the tubular member, and bobbing means coacting with the tubular member to bob the pear.

7. In a device of the class described, the combination of means for holding a pear with its stem axis extending in a predetermined direction, a combined bobbing gauge and neck holding device including an elongated tubular member adapted to be shifted relatively to the pear and in a direction co-axial with the stem axis of the pear into a position circularly to engage the neck of the pear adjacent but removed from the base of the pear with the stem projecting freely into the tubular member, plunger means operable in the tubular member and movable longitudinally and relatively thereto, bobbing means adapted to move across the stem axis of the pear and in cooperation with the tubular member to bob the pear, means for producing relative movement between the plunger means and the tubular member to cause the plunger means to eject the bobbed stem of the pear from said tubular member.

8. In a pear bobbing device, the combination of a support, means thereon adapted to hold a pear with its stem axis extending in a predetermined direction, a stationary guide overlying and extending parallel to the stem axis of the pear while so held, said guide having a spline, a sleeve slidably mounted on said spline and having an upstanding bracket, a friction roller on said upstanding bracket, said upstanding bracket having a dependent portion, a bracket laterally extending from said dependent portion provided with a circular bearing, a second sleeve rotatably mounted on said first sleeve, said second sleeve having a forwardly projecting forked portion, said forked portion having a laterally extending bracket, a bobbing knife mounted on said latter bracket, means for holding said first mentioned sleeve from rotation, spring means for normally urging said first mentioned sleeve and said second mentioned sleeve in a forward direction, a gear rotatably mounted on said guide, said gear carrying a lug adapted to engage the forks of said forked portion of said second sleeve, a coil spring coiled about said bracket and having one end stationarily held and the other anchored to said gear, a transversely extending shaft, a cam rigidly mounted on said shaft and having a counterseat, a geared sector having a hub rotatably mounted with respect to said shaft, said hub being seated in the countersunk portion of said cam, there being a lost motion connection between said cam and said sector, power means to actuate said last mentioned shaft, the teeth of said sector engaging the teeth of said first mentioned gear, tubular means carried by the bearing of the bracket that is mounted on the first mentioned sleeve, said tubular means having a circular support adapted circularly to engage the neck of the pear with the stem of the pear projecting into the tubular means, and a plunger mounted within the tubular means and having a stem stationarily carried by the support frame of the machine.

9. The combination with a support, a turret on said support carrying a plurality of fruit holders, each holder adapted to hold a pear with its stem axis in predetermined position, means intermittently to rotate the turret to position a held pear at a bobbing station, a carriage at said station including spring actuating means, a sleeve shiftable by said spring means along an axis co-axial with the stem axis of the pear when so positioned at said station, said sleeve having an outer portion adapted circularly to engage the neck of the pear adjacent the base of the stem of the pear to hold the outer end of the pear from movement when so engaged, the stem of the pear projecting into the hollow of the sleeve, bobbing means movable with said sleeve, and power actuated means synchronized with the movement of the turret whereby, when said pear is moved to the bobbing station, to release the carriage to permit the spring means to shift the sleeve into contact resilient with the neck of the pear and thereafter to actuate the bobbing means transversely of the stem axis of the pear whereby to bob the pear and thereafter to shift said carriage with the bobbing means, said turret rotating means sleeve away from the pear and thereafter moving the turret to transport the bobbed pear away from the bobbing station and bring another pear to the bobbing station.

10. The combination with a support, a turret on said support carrying a plurality of fruit holders, each holder adapted to hold a pear with its stem axis in predetermined position, means intermittently to rotate the turret to position a held pear at a bobbing station, a carriage at said station including spring actuating means, a sleeve shiftable by said spring means along an axis co-axial with the stem axis of the pear when so positioned at said station, said sleeve having an outer portion adapted circularly to engage the neck of the pear adjacent the base of the stem of the pear to hold the outer end of the pear from movement when so engaged, the stem of the pear projecting into the hollow of the sleeve, bobbing means movable with said sleeve, power actuated means synchronized with the movement of the turret whereby, when said pear is moved into bobbing position, to release the carriage to permit the spring means to shift the sleeve resiliently into contact with the neck of the pear and thereafter to actuate the bobbing means transversely of the stem axis of the pear whereby to bob the pear and thereafter to shift said carriage with the bobbing means, said turret rotating means sleeve away from the pear and thereafter moving the turret to transport the bobbed pear away from the bobbing station and bring another pear to the bobbing station, and plunger means adapted to act through the bore of the hollow sleeve upon retraction of the hollow sleeve to eject the bobbed end of the pear from the hollow sleeve.

11. In a bobbing device, the combination, with a means for holding a pear with its stem in a predetermined direction, of a tube adapted to be placed to encircle the neck of the pear with the stem of the pear extending into the tube, a bobbing knife movable in a path across the stem axis of the pear, said tube at its inner end being provided with an outwardly flaring flange the forward edge of which is formed at a relatively acute angle to guide the knife across the mouth of the outwardly flaring flange of the tube and bobbing the pear.

12. In a device of the class described, the combination of means for supporting a pear with its stem axis in a predetermined direction, a guideway having its central axis disposed in a plane parallel to the stem axis of said pear, a sleeve shiftable longitudinally of said guideway and carrying a depending bracket, a guard extending from said bracket across but beneath the stem axis of the pear, a second sleeve rotatably mounted on said first sleeve, said second sleeve carrying a bobbing knife, and means to swing said second sleeve relative to the first sleeve, the path of movement of said bobbing knife being adjacent but to the rear of said guard.

13. In a device of the class described, the combination of means for holding a pear with its stem axis in a predetermined position, means for holding the neck of the pear, a guide having its central axis parallel with the axis of the pear in said holding means, a sleeve splined to said guide, said sleeve having a depending bracket, a knife guard having an L-shaped bracket, one face of the L of said bracket being affixed to the depending bracket, said guard extending laterally from said face of the bracket and curving upwardly, a second guard having a flange adapted to be affixed to the other face of said L-shaped bracket and having a knife guarding portion extending parallel to but spaced from the first named guard, a knife guard plate affixed to the outer curved end of the first named guard, a second sleeve rotatably mounted upon said first sleeve, said second sleeve carrying a bobbing knife disposed immediately in front of said second mentioned holding means, means for reciprocating and rotating said sleeve to position the bobbing knife and guards in operative position in relation to the pear to be bobbed, and means to shift the bobbing knife across the stem axis of the pear, said guards and guard plate surrounding and lying in front of the path of movement of said bobbing knife to protect the hands of the operator.

14. In a device of the class described, the combination of means for holding a pear with its stem axis in a predetermined direction, a guide frame, a carriage shiftable longitudinally thereof, said carriage having a bracket thereon, said bracket including a split bearing collar having spaced apart laterally extending ears, adjusting means passing through said ears, a tube passing through the bearing of said collar and adapted to be longitudinally adjusted therein, said tube having an outer portion for circularly engaging the neck of the pear, bobbing means adapted to cooperate with said tube to bob the pear, and means for shifting the carriage longitudinally with respect to the stem axis of the pear to move the tube into and out of contacting position with respect to the neck of the pear.

15. In a machine for bobbing fruit or the like, the combination of means for receiving and holding a fruit with the end to be bobbed extending beyond the holding means, means including an abutment having a circular opening therein, means for shifting said fruit holding means and said abutment means relatively to cause the circular wall of the opening of said abutment to circumferentially contact the fruit adjacent the end to be bobbed and spaced from the holding means, the stem of the fruit projecting into the opening in said abutment, and bobbing means mounted for movement transversely of the stem axis of the fruit between the abutment means and the holding means to sever the end of the fruit from the body of the fruit supported in said holding means.

16. In a bobbing device for fruit, the combination of means for holding the fruit with one end extending beyond the holding means, a hollow member open at one end, means for shifting the holding means and the hollow member relatively to cause the hollow member at its open end to contact the fruit at the end to be bobbed and spaced from the holding means, the stem of the fruit projecting through the open end into the hollow member, means for bobbing the fruit including cutting means movable in a plane across the fruit between the hollow member and the holding means to sever the end of the fruit from the body of the fruit in said holding means.

17. In a bobbing device for fruit, the combination of means for holding the fruit with one end extending beyond the holding means, a hollow member open at one end, means for shifting the holding means and the hollow member relatively to cause the hollow member at its open end to contact the fruit at the end to be bobbed and spaced from the holding means, the stem of the fruit projecting through the open end into the hollow member, means for bobbing the fruit including cutting means movable in a plane across the fruit between the hollow member and the holding means to sever the end of the fruit from the body of the fruit in said holding means, and means within said hollow member and movable relative thereto to eject the stem and bobbed end of the fruit from said hollow member.

18. In a device for bobbing fruit, a combination of means for holding the fruit with the stem end of the fruit extending beyond the holding means, a hollow member having an open end, means for shifting the hollow member axially of the fruit into contact with the stem end of the fruit and spaced from the holding means, the stem of the fruit projecting into the hollow member, said hollow member having an outwardly flaring skirt at its open end to accommodate fruit of variant sizes, and bobbing means adapted for movement transversely of the stem axis of the fruit between the hollow member and the holding means and adjacent the outer edge of the outwardly flaring skirt to sever the stem end of the fruit from the body of the fruit supported by said holding means.

19. In a device for bobbing fruit, a combination of means for holding the fruit with the stem end of the fruit extending beyond the holding means, a hollow member having an open end, means for shifting the hollow member axially of the fruit into contact with the stem end of the fruit and spaced from the holding means, the stem of the fruit projecting into the hollow member, said hollow member having an outwardly flaring skirt at its open end to accommodate fruit of variant sizes, and bobbing means adapted for movement transversely of the stem axis of the fruit between the hollow member and the holding means and adjacent the outer edge of the outwardly flaring skirt to sever the stem end of the fruit from the body of the fruit supported by said holding means, and means movable within said hollow member and relative thereto for ejecting the stem and the bobbed end of the fruit from said member.

20. In a fruit treating machine, a turret carrying a plurality of fruit holders, each adapted to hold a fruit with the stem end extending beyond the holder, means to rotate the turret intermittently to position a held fruit at a bobbing station, a sleeve shiftable along an axis concentric with the stem axis of the fruit when positioned at the bobbing station, said sleeve having an outer portion adapted to contact the fruit at the stem end thereof and spaced from the fruit holder, the stem of the fruit projecting into the sleeve, bobbing means including a cutter movable transversely of the stem axis of the fruit and between the holder at the bobbing station and the sleeve, means synchronized with the movement of the turret to move said sleeve into contact with the stem end of the fruit at the bobbing station and thereafter to move said cutter across the fruit to sever the stem end of the fruit from the body of the fruit supported in the holder at the bobbing station.

21. In a fruit treating machine, a turret carrying a plurality of fruit holders, each adapted to hold a fruit with the stem end extending beyond the holder, means to rotate the turret intermittently to position a held fruit at a bobbing station, a sleeve shiftable along an axis concentric with the stem axis of the fruit when positioned at the bobbing station, said sleeve having an outer portion adapted to contact the fruit at the stem end thereof and spaced from the fruit holder, the stem of the fruit projecting into the sleeve, bobbing means including a cutter movable transversely of the stem axis of the fruit and between the holder at the bobbing station and the sleeve, means synchronized with the movement of the turret to move said sleeve into contact with the stem end of the fruit at the bobbing station and thereafter to move said cutter across the fruit to sever the stem end of the fruit from the body of the fruit supported in the holder at the bobbing station, and means thereafter operative through the bore of the sleeve for ejecting the stem and the bobbed end of the fruit from the sleeve.

22. A combined holding and gauging tube for a pear bobbing machine comprising an elongated tube having an outwardly flaring slightly dished flange at the end thereof adapted to encirclingly contact the end of the pear adjacent the stem thereof, whereby to automatically center the stem ends of pears of various sizes, the tube receiving the bobbed ends of the fruit therein, and means operative through the tube for ejecting the bobbed ends from the tube.

23. In a machine of the character described, a combined fruit holding and gauging tube having an outwardly flaring flange at one end thereof adapted to contact and encircle the stem end of the fruit, whereby to center the stem ends of fruit of variant sizes, a bobbing knife movable across the mouth of the outwardly flaring flange of the tube to sever the stem end of the fruit from the body thereof, leaving the bobbed end in the tube, and means operative through the tube for ejecting the bobbed ends from the tube.

24. In a bobbing device for pears comprising means for holding a pear with its stem end extending beyond the holding means, a bobbing head including a shiftable support movable parallel to the stem axis of the pear, a member carried by said support and adapted to engage the pear at the stem end thereof and spaced from the holding means, a bobbing knife swingably mounted on said shiftable support for movement transversely to the stem axis of the pear and between said member and said holding means to sever the stem end of the pear from the body of the pear in said holding means, and a guard on said shiftable support extending across and beneath the pear in advance of the path of movement of said knife when said member contacts the fruit to be bobbed.

25. In a machine for bobbing pears or the like, the combination of means for receiving and holding a pear with the end to be bobbed extending beyond the holding means, a gauge or an abutment adapted to contact the neck of the pear to engage and to hold the same during cutting, bobbing means adapted to move transversely of the stem axis of the pear to bob the neck and stem therefrom, means for moving the abutment and the bobbing means parallel to and longitudinally of the stem axis of the held pear, the abutment controlling the position of movement of the bobbing means relatively to the neck of the pear, means for moving the bobbing means transversely of the stem axis of the pear when so positioned by the abutment, said bobbing means moving between the abutment and the holding means to sever the end of the neck of the pear while held in the holding means, and a bobbing knife guard adapted to lie parallel to the path of movement of the bobbing knife and to shift with said knife and with said abutment in a direction parallel to and longitudinally of the stem axis of the fruit while held by the holding means.

26. In a machine for bobbing pears and the like, the combination of means for receiving and holding a pear with the end to be bobbed extending in a predetermined direction beyond the holding means, a gauge, a bobbing knife and a bobbing knife guard mounted for simultaneous movement in a direction parallel of and longitudinally of the stem axis of the pear while so held, said gauge being constructed and arranged to contactingly engage the neck of the pear during such movement whereby to determine the bobbing position of the bobbing blade, the path of movement of the bobbing blade being disposed adjacent the gauge, and means for shifting the bobbing knife transversely across the stem axis of the pear while so held and while the bobbing knife is so positioned by the gauge, whereby to bob the neck of the pear, the knife guard lying parallel to the path of movement of the bobbing knife during its bobbing operation and arranged to protect the operator during such bobbing movement.

27. In a machine for bobbing pears or the like, the combination of means for holding the whole pear with the stem axis extending in a predetermined direction, a bobbing knife, means for moving the bobbing knife in a direction parallel of the stem axis of the held pear into position to bob the held pear, said moving means including a support, a knife guard mounted on said support and movable with said bobbing knife parallel of and longitudinally of the stem axis of the pear, and means to move the bobbing knife transversely of the stem axis of the pear when said bobbing knife is positioned to bob the pear, said knife guard extending transversely of the stem axis of the pear and lying parallel to the transverse path of movement of the bobbing knife.

RAYMOND L. EWALD.

CERTIFICATE OF CORRECTION.

Patent No. 2,321,590.   June 15, 1943.

RAYMOND L. EWALD.

It is hereby certified that error appears in the printed specification of the above numbered patent requiring correction as follows: Page 2, first column, line 29, for "and" after "support" read --an--; page 4, first column, line 15, for "neck to" read --neck of--; page 6, first column, lines 26 and 27, claim 9, for "contact resilient" read --resilient contact--; lines 31 and 32 and lines 60, 61 and 62, claims 9 and 10 respectively, strike out the words "bobbing means, said turret rotating means sleeve away from the pear and" and insert instead --bobbing means and sleeve away from the pear, said turret rotating means--; and that the said Letters Patent should be read with this correction therein that the same may conform to the record of the case in the Patent Office.

Signed and sealed this 10th day of August, A. D. 1943.

Henry Van Arsdale,
Acting Commissioner of Patents.

(Seal)